US012587497B2

(12) United States Patent
Lee et al.

(10) Patent No.: US 12,587,497 B2
(45) Date of Patent: Mar. 24, 2026

(54) METHOD FOR SYNCHRONIZING MESSAGES BETWEEN PLURALITY OF MESSENGER CLIENT DEVICES AND MESSENGER CLIENT DEVICE USING SAME

(71) Applicant: SAMSUNG SDS CO., LTD., Seoul (KR)

(72) Inventors: Jane Lee, Seoul (KR); Yunki Oh, Seoul (KR); Seunggwon Paek, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 0 days.

(21) Appl. No.: 18/676,629

(22) Filed: May 29, 2024

(65) Prior Publication Data

US 2024/0406132 A1 Dec. 5, 2024

(30) Foreign Application Priority Data

May 31, 2023 (KR) ........................ 10-2023-0070164

(51) Int. Cl.
*G06F 15/16* (2006.01)
*H04L 51/42* (2022.01)

(52) U.S. Cl.
CPC .................................... *H04L 51/42* (2022.05)

(58) Field of Classification Search
CPC ...................................................... H04L 51/42
USPC ......................................................... 709/206
See application file for complete search history.

(56) References Cited

U.S. PATENT DOCUMENTS

| | | | | |
|---|---|---|---|---|
| 11,201,918 B2 * | 12/2021 | Baron | .................... | H04W 76/11 |
| 11,516,154 B2 * | 11/2022 | Vasudeva | .............. | H04L 51/046 |
| 11,558,322 B2 | 1/2023 | Maierean | | |
| 11,907,013 B2 * | 2/2024 | Yang | ..................... | G06F 3/0488 |
| 11,907,605 B2 * | 2/2024 | Chang | .................... | G06F 3/1454 |
| 2011/0161446 A1 | 6/2011 | Kim | | |
| 2016/0105389 A1 | 4/2016 | Zheng | | |
| 2021/0168204 A1 | 6/2021 | Onianwa et al. | | |
| 2021/0281641 A1 * | 9/2021 | Baron | ..................... | H04L 47/34 |

FOREIGN PATENT DOCUMENTS

| | | |
|---|---|---|
| EP | 3 142 304 B1 | 5/2020 |
| KR | 10-2011-0074244 A | 6/2011 |

OTHER PUBLICATIONS

European search report issued on Oct. 22, 2024, in counterpart European Patent Application No. 24178468.5 (5 pages).

* cited by examiner

*Primary Examiner* — Alicia Baturay
(74) *Attorney, Agent, or Firm* — NSIP Law

(57) ABSTRACT

The disclosure relates to a method for synchronizing messages between a plurality of messenger client devices, and a messenger client device using the same, and the method for synchronizing messages between a plurality of messenger client devices to which a user account is shared according to an embodiment of the disclosure may include: accessing a pre-configured public repository and downloading public data including a previous chat list shared between the plurality of messenger client devices by a messenger client device; and generating merged data by merging the public data and local data including a previous chat list stored in a local repository of the messenger client device by the messenger client device.

20 Claims, 10 Drawing Sheets

START

MESSENGER CLIENT DEVICE LOADS LOCAL DATA INCLUDING PREVIOUS CHAT LIST STORED IN ITS LOCAL REPOSITORY — S10

MESSENGER CLIENT DEVICE ACCESSES PRE-CONFIGURED PUBLIC REPOSITORY TO DOWNLOAD PUBLIC DATA INCLUDING PREVIOUS CHAT LIST SHARED BETWEEN PLURALITY OF MESSENGER CLIENT DEVICES — S20

MESSENGER CLIENT DEVICE GENERATES MERGED DATA BY MERGING LOCAL DATA AND PUBLIC DATA — S30

MESSENGER CLIENT DEVICE DISPLAYS SYNCHRONIZED PREVIOUS CHAT LIST BY USING MERGED DATA — S40

MESSENGER CLIENT DEVICE GENERATES PUBLIC DATA TO WHICH GENERATED MESSAGE IS REFLECTED AND UPLOADS SAME TO PUBLIC REPOSITORY — S50

END

FIG. 6A

| CHAT ROOM DATA |
| --- |
| CHAT ROOM ID |
| CHAT ROOM TITLE |
| ARTICIPATION LIST |
| CHAT ROOM ID |
| CHAT ROOM STATE |
| CHAT ROOM MODIFICATION TIME POINT |

FIG. 6B

| MESSAGE DATA |
| --- |
| MESSAGE ID |
| CHAT ROOM ID |
| MESSAGE SENDER |
| MESSAGE CONTENT |
| TRANSMISSION TIME POINT |
| MESSAGE MODIFICATION TIME POINT |

METHOD FOR SYNCHRONIZING MESSAGES BETWEEN PLURALITY OF MESSENGER CLIENT DEVICES AND MESSENGER CLIENT DEVICE USING SAME

CROSS-REFERENCE TO RELATED APPLICATION(S)

This application is based on and claims priority under 35 U.S.C. 119 to Korean Patent Application No. 10-2023-0070164, filed on May 31, 2023, in the Korean Intellectual Property Office, the disclosure of which is herein incorporated by reference in its entirety.

BACKGROUND OF THE INVENTION

1. Field of the Invention

The disclosure relates to a method for synchronizing, using a public repository, messages between a plurality of messenger client devices to which a user account is shared, and a messenger client device using same.

2. Description of the Prior Art

An instant messenger is widely utilized as a useful method for transferring information in real time by using the Internet. The instant messenger is for transferring a simple message between users in real time, and the users can talk through text messages transferred in real time like they talk in person. In addition, as a messenger service is extended from the existing PC-based messenger service to an IP-based mobile messenger, the messenger is widely utilized for communication for work, in addition to friendship promotion between individuals.

However, for security or resource reasons or other reasons, when a messenger server has a constraint in storing messages for only a predetermined period, messages stored more than the period are stored in a local repository of each of the messenger clients. In this case, when login is performed using one user account in various environments such as a smartphone, a desktop, and a virtualization PC, the messages locally stored in the respective messenger clients may be different from each other, and a phenomenon that the respective messenger clients show different previous chat list messages may occur. Accordingly, it is difficult to continuously perform work on the basis of the messengers in various working environments.

SUMMARY OF THE INVENTION

The disclosure is to provide a method for synchronizing messages between a plurality of messenger client devices, and a messenger client device using the same, wherein local data stored in the messenger client device is uploaded to a public repository and messages can be shared without involvement of a messenger server.

The disclosure is to provide a method for synchronizing messages between a plurality of messenger client devices, and a messenger client device using the same, wherein even though there is a message storage period policy exists, previous chat list messages may be equally displayed when logging into any messenger client device.

A method for synchronizing messages between a plurality of messenger client devices according to an embodiment of the disclosure may include: accessing a pre-configured public repository and downloading public data including a previous chat list shared between the plurality of messenger client devices by a messenger client device; and generating merged data by merging the public data and local data including a previous chat list stored in a local repository of the messenger client device by the messenger client device.

Here, the downloading of the public data may include downloading the public data when logging into one of the plurality of messenger client devices with the user account, or when the logged messenger client device enters one of chat rooms generated by the user account Here, the local data may be obtained by receiving server data corresponding to a previous chat list of the user account from the messenger server and performing updating using the server data.

Here, the downloading of the public data may include identifying access information of the public repository by the messenger client device, accessing the public repository by using the access information, and omitting downloading of the public data when the access information does not exist.

Here, the generating of the merged data may include when there is a data storage period policy, removing messages, the data storage period of which has passed, from messages included in the merged data, according to the data storage period policy, so as to modify the merged data.

Here, the local data and the public data may include at least one of a chat room ID, a chat room title, a participant list, a chat room generation time point, a chat room state, and a chat room modification time point for each of chat rooms generated by the user account, and may include at least one of a message ID, a chat room ID, a message sender, message content, a transmission time point, and a message modification time point for each of messages included in each of the chat rooms.

Here, the method for synchronizing messages between a plurality of messenger client devices according to an embodiment of the disclosure may further include displaying a synchronized previous chat list by the messenger client device by using the merged data.

Here, the generating of the merged data may include: identifying a data list of public data included in the public data; when there are one or more data lists of the public data, selecting one piece of unit public data from among the data list of the public data, and searching for unit local data having the same ID as the unit public data in the local data; when there is no unit local data having the same ID, adding the unit public data to the local data and deleting the unit public data; when there is unit local data having the same ID, comparing modification time points of the unit local data and the unit public data, updating the unit local data to the unit public data when the modification time point of the unit public data is after the modification time point of the unit local data, and deleting the unit public data; when there is unit local data having the same ID and the modification time point of the unit public data is before the modification time point of the unit local data, deleting the unit public data; and updating the data list of the public data, returning to the identifying of the list of the public data, and repeating the same until the public data list becomes 0.

Here, the downloading of the public data may include when there are a plurality of public repositories, accessing each of the public repositories and downloading the public data.

Here, the generating of the merged data may include generating the merged data by merging the local data and all public data downloaded from the public repositories.

Here, the method for synchronizing messages between a plurality of messenger client devices according to an embodiment of the disclosure may further include generating public data to which a message generated by the messenger client device is reflected, and uploading the generated public data to the public repository.

Here, the uploading to the public repository may include: loading, by the messenger client device, local data stored in a local repository of the messenger client device; accessing the public repository and determining identity between the local data and public data stored in the public repository, by the messenger client device; when the local data and the public data are different from each other, downloading the public data and deleting the public data from the public repository; and generating merged data by merging the local data and the public data, and uploading the merged data to the public repository, as the public data.

Here, the determining of the identity may include comparing file sizes of the local data and the public data to determine that the local data and the public data are different from each when the file sizes are different.

Here, the uploading of the merged data as the public data may further include: generating the merged data by merging the local data and the public data; identifying whether there is other piece of public data in the public repository; when there is other piece of public data, downloading the public data, and returning to the deleting of the public data from the public repository; and when there is no other piece of public data, uploading the merged data as the public data.

Here, the uploading to the public repository may include generating the public data and uploading the generated public data to the public repository in at least one of a case where a messenger application that is being executed by the messenger client device has been executed for a configured time interval or longer, a case where a pre-defined specified time arrives, a case where a configured number or more of messages are transmitted or received, a case where a logout occurs for the messenger application, a case where the messenger application ends, a case where a hardware state of the messenger client device satisfies a configured condition, and a case where a user inputs a synchronization command on the messenger application.

Here, the uploading to the public repository may include backing up and storing the public data to two or more of a plurality of public repositories.

According to an embodiment of the disclosure, there may be a computer program connected to hardware and stored in a medium to execute the above-described message synchronization method.

A messenger client device for synchronizing messages between a plurality of messenger client devices to which a user account is shared according to an embodiment of the disclosure may include a processor, wherein the processor is configured to: access a pre-configured public repository and download public data including a previous chat list shared between the plurality of messenger client devices; and generate merged data by merging the public data and local data including a previous chat list stored in a local repository.

Here, the generating of the merged data may include: identifying a data list of public data included in the public data; when there are one or more data lists of the public data, selecting one piece of unit public data from among the data list of the public data, and searching for unit local data having the same ID as the unit public data in the local data; when there is no unit local data having the same ID, adding the unit public data to the local data and deleting the unit public data; when there is unit local data having the same ID, comparing modification time points of the unit local data and the unit public data, updating the unit local data to the unit public data when the modification time point of the unit public data is after the modification time point of the unit local data, and deleting the unit public data; when there is unit local data having the same ID and the modification time point of the unit public data is before the modification time point of the unit local data, deleting the unit public data; and updating the data list of the public data, returning to the identifying of the list of the public data, and repeating the same until the public data list becomes 0.

Here, in the messenger client device according to an embodiment of the disclosure, the processor may be further configured to generate public data to which a message generate by the messenger client device is reflected, and upload the generated public data to the public repository.

In addition, the solutions to the problems above do not enumerate all features of the disclosure. Various features of the disclosure and advantages and effects thereof may be understood in more detail with reference to the following specific exemplary embodiments.

According to a method for synchronizing messages between a plurality of messenger client devices, and a messenger client device using the same according to an embodiment of the disclosure, even though there is a message storage period policy exists, previous chat list messages can be equally displayed when logging into any messenger client device. Accordingly, it is possible to continuously perform work on the basis of the messenger in various working environments.

According to a method for synchronizing messages between a plurality of messenger client devices, and a messenger client device using the same according to an embodiment of the disclosure, synchronized public data can be downloaded from a public repository shared among the respective messenger client devices, and synchronized messages can be displayed by reflecting the downloaded data in a local environment, Accordingly, it is possible to synchronize messages between the plurality of messenger client devise without involvement of the messenger server.

However, advantageous effects which can be achieved by the method for synchronizing messages between a plurality of messenger client devices and the messenger client device using the same according to the embodiments of the disclosure are not limited to the aforementioned effects, and other unmentioned advantageous effects will be clearly understood by those skilled in the art to which the disclosure belongs from the following description.

BRIEF DESCRIPTION OF THE DRAWINGS

The above and other aspects, features, and advantages of the present disclosure will be more apparent from the following detailed description taken in conjunction with the accompanying drawings, in which:

FIG. 6 illustrates an example of local data and public data according to an embodiment of the disclosure;

DETAILED DESCRIPTION OF THE EXEMPLARY EMBODIMENTS

Figure 1:
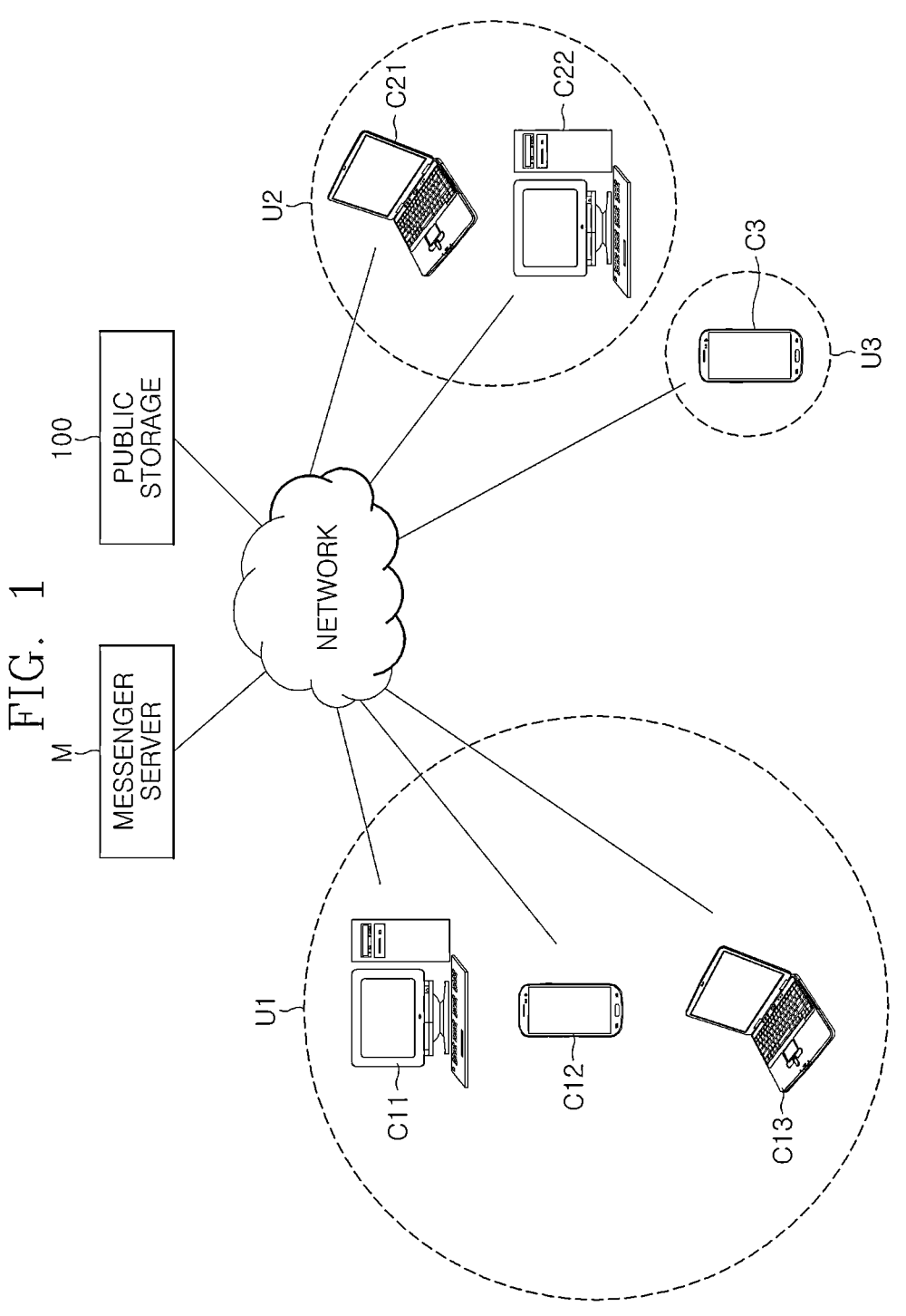
FIG. 1 is a schematic diagram illustrating an online messenger system according to an embodiment of the disclosure.

Hereinafter, exemplary embodiments disclosed in this specification will be described in detail with reference to the accompanying drawings and the same or similar components are denoted by the same reference numerals regardless of a sign of the drawing, and duplicated description thereof will be omitted. Suffixes "module" and "unit" for components used in the following description are given or mixed in consideration of easy preparation of the specification only and do not have their own distinguished meanings or roles. Furthermore, the term "unit" used in disclosure means software and hardware components such as FPGA or ASIC and the "unit" performs predetermined roles. However, the "unit" is not a meaning limited to software or hardware. The "unit" may be configured to reside on an addressable storage medium and may be configured to play back one or more processors. Accordingly, as one example, the "unit" includes components such as software components, object oriented software components, class components, and task components, processes, functions, attributes, procedures, subroutines, segments of a program code, drivers, firmware, microcode, circuitry, data, databases, data structures, tables, arrays, and variables. Functions provided in the components and the "units" may be combined into a smaller number of components and "units" or further separated into additional components and "units".

In addition, in describing the exemplary embodiment of this specification, a detailed description of related known technologies will be omitted if it is determined that the detailed description makes the gist of the exemplary embodiment disclosed in this specification unclear. Furthermore, it is to be understood that the accompanying drawings are just used for easily understanding the exemplary embodiments disclosed in this specification and a technical spirit disclosed in this specification is not limited by the accompanying drawings and all changes, equivalents, or substitutes included in the spirit and the technical scope of the disclosure are included.

FIG. 1 is a schematic diagram illustrating an online messenger system according to an embodiment of the disclosure.

Referring to FIG. 1, an online messenger system according to an embodiment of the disclosure may include messenger client devices C11, C12, C13, C21, C22, and C3, a messenger server M, and a public repository 100.

Hereinafter, an online messenger system according to an embodiment of the disclosure is described with reference to FIG. 1.

Each of the messenger client devices C11, C12, C13, C21, C22, and C3 may be a user terminal in which a messenger application receiving an online messenger service is installed. Each of the messenger client devices C11, C12, C13, C21, C22, and C3 may access the messenger server M on a network by using the messenger application, and may transmit or receive a message including various contents such as text, audio, an image, a video, and a file, to or from other messenger client devices through the messenger server M. The user terminal may be a smartphone, a tablet PC, a laptop computer, a wearable device, a desktop computer, etc., and may also include any device capable of accessing the messenger server M through a wired or wireless network and exchanging information.

Here, the network may be configured regardless of a communication mode thereof, such as wired and wireless modes, and may be configured by various communication networks such as a personal area network (PAN), a local area network (LAN), a metropolitan area network (MAN), and a wide area network (WAN). Furthermore, the network may be a known world wide web (WWW), and may also use wireless transmission techniques used in personal communication, such as infrared data association (IrDA) or Bluetooth.

The messenger server M may be a server for performing a role of transmitting or receiving data required to execute messenger application to or from the messenger client devices C11, C12, C13, C21, C22, and C3. Here, the messenger server M may be operated by a supplier for producing a messenger application and providing a service based on the messenger application.

The messenger application may provide a service by which the messenger client devices C11, C12, C13, C21, C22, and C3 having installed the messenger application can have a chat in real time through the Internet. The messenger server M may generate a chat room for a chat between users, and when a chat room is generated, a message transmitted from each of the messenger client devices C11, C12, C13, C21, C22, and C3 may be transmitted to each corresponding counterpart messenger client device C11, C12, C13, C21, C22, and C3 through the chat room.

Here, the generated chat room may be maintained within the messenger application unless there is a separate end input. Accordingly, the user can enter a chat room by selecting one from a list of multiple generated chat rooms, and can have a chat with users participating in the corresponding chat room in real time. In addition, the messenger application may allow generation of a group chat room to which multiple users participate, in addition of a 1:1 chat room, and allow multiple users to have a chat in real time through the group chat room. According to an embodiment, a user may generate a channel thread to allow multiple users to participate in the channel thread. Here, the messenger application may be a messenger application for business, which is used by a company, a public institution, etc.

Respective users U1, U2, and U3 may exchange messages with other users by using the plurality of messenger client devices C11, C12, C13, C21, C22, and C3. That is, one user U1 may install a messenger application in each of his or her smartphone C12, laptop computer C13, and desktop C11, and may log into one of them with his or her user account to receive a messenger service. For example, the user U1 may use the messenger application in his or her desktop C11 at work, and may log into the messenger application with his or her smartphone C12 or laptop computer C13 while working at home or during a business trip. Here, a counterpart user U2 may also exchange messages with the user U1 by using the plurality of messenger client devices C21 and C22, and in some cases, a user U3 may use only one messenger client C3.

In this case, in a case of a messenger for work, for security or resource reasons, etc., a period of storing messages in the messenger server M may be restricted. That is, the messenger server M may delete messages stored more than a predetermined period (for example, two weeks) from the server, or may be stop transferring the messages to other messenger client devices. Accordingly, in a case of the user U1 who receives a messenger service by using various messenger client devices C11, C12, and C13, a phenomenon that messages are stored differently and fragmented for the respective messenger client devices C11, C12, and C13 may occur. That is, messages locally stored may be different from the respective messenger client devices C11, C12, and C13, not all messages are stored in the messenger server M, and thus a phenomenon that messages of a previous chat list in a chat room are shown differently for the respective messenger client devices C11, C12, and C13.

Here, for security reasons, etc., even though the messenger server M does not transfer the messages, the storage period of which has passed, to enable work to be continuously performed in various work environments, there is a need for implementation that the messages are shown equally when access is made in any environments. Accordingly, even in a case of a messenger system having a message storage period policy, there is a need for displaying messages of the previous chat list equally even though access is made using any messenger client device.

To this end, an online messenger system according to an embodiment of the disclosure may further include a public repository 100 to synchronize messages among a plurality of messenger client devices C11, C12, and C13 without involvement of the messenger server M.

The public repository 100 may store public data of messages to enable the messages to be synchronized among a plurality of messenger client devices C11, C12, and C13 to which a user account of the same user U1 is shared. That is, the respective messenger client devices C11, C12, and C13 may share the same public repository 100, and the respective messenger client devices C11, C12, and C13 may access the public repository 100 shared during login and download the synchronized public data. Thereafter, each of the respective messenger devices may reflect the downloaded public data to local data stored its local repository to synchronize the local data and messages of the previous chat room, etc.

In addition, each of the respective messenger client devices C11, C12, and C13 may upload the local data stored in its local repository to the public repository 100 so that the same messages of the previous chat list can be displayed even when a user accesses the application by using other messenger client devices C11, C12, and C13.

Here, the messenger client devices C11, C12, and C13 may upload public data to the public repository 100 when the user U1 logs out of the messenger client devices C11, C12, and C13 or the messenger application ends from the messenger client devices C11, C12, and C13. In addition, according to an embodiment, when a configured time passes (for example, every 10 minutes) while the messenger application is executed or when a pre-defined specified time point (for example, 12:01 AM) arrives, data in the local repository may be uploaded to the public repository 100. In addition, a hardware state of each of the messenger client clients C11, C12, and C13 satisfies a configured condition (for example, when a CPU usage, a memory usage, and a network usage are equal to or less than a reference value), when the user directly inputs a synchronization command on the messenger application, or when a predetermined number (for example, 100) messages are transmitted or received, data in the local repository may be uploaded to the public repository 100.

Figure 2:
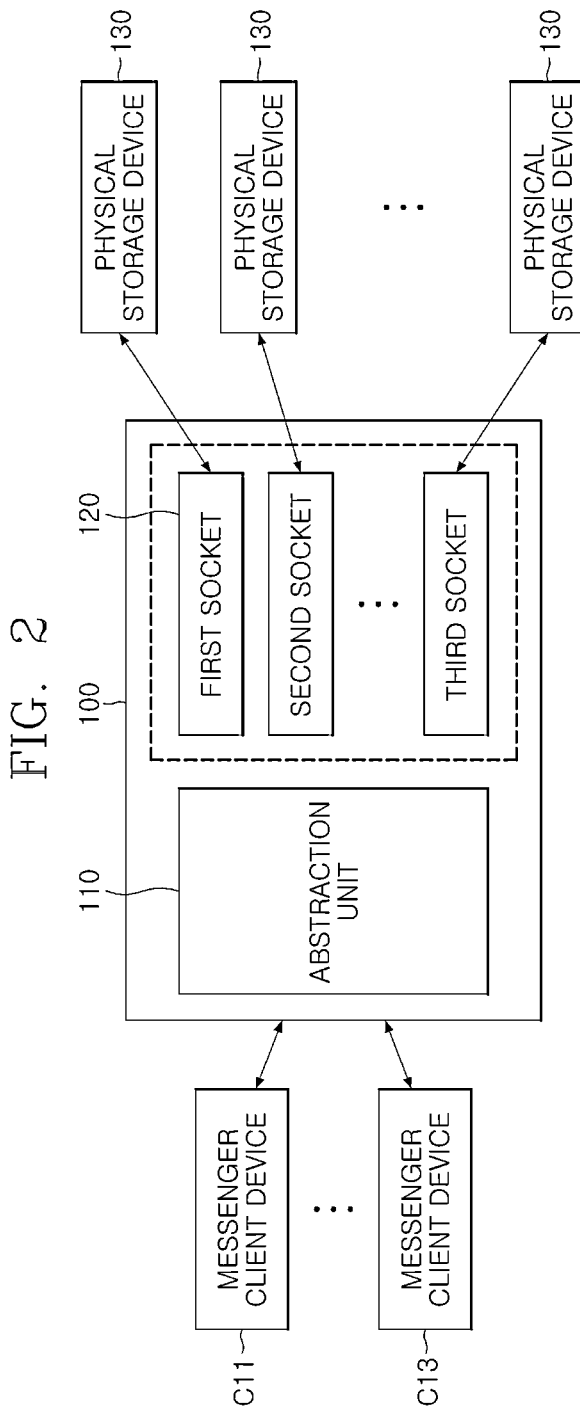
FIG. 2 is a block diagram illustrating a public repository according to an embodiment of the disclosure.

Referring to FIG. 2, a public repository 100 according to an embodiment of the disclosure may include an abstraction unit 110, a socket unit 120, and a physical storage device 130.

The abstraction unit 110 may perform communication with a plurality of messenger client devices C11, C12, and C13, and may receive, from the plurality of messenger client devices C11, C12, and C13, a request for access to the public repository 100, or may receive a request for downloading, uploading, or deletion of the public data.

Here, the abstraction unit 110 may group the plurality of plurality of physical storage devices 130 into one public repository 100, and the messenger client devices C11, C12, and C13 may perform data transmission or reception with each of the physical storage devices 130 while depending on the abstraction unit 110. The abstraction unit 110 may relay communication with the socket unit 120 to access each of the physical storage devices 130 upon the request from the messenger client devices C11, C12, and C13.

The socket unit 120 may include a plurality of network sockets corresponding to the plurality of physical storage devices 130, respectively, and the network sockets may actually access the physical storage devices 130, respectively, on the basis of a parameter received from the abstraction unit 110, and perform data transmission or reception.

The physical storage device 130 may include any element capable of storing data, such as a diskette, a universal serial bus (USB) storage device, a network repository, a cloud server, or a file server, and may perform data transmission or reception using a file transmission or reception protocol such as secure copy (SCP).

Here, the physical storage devices 130 corresponding to the messenger client devices C11, C12, C13, C21, C22, €23, and C3, respectively, may be configured different for each of the messenger client devices. In this case, the messenger client devices C11, C12, C13, C21, C22, €23, and C3 may perform synchronization with all configured physical storage devices 130, and according to an embodiment, may select a specific physical storage device from among the configured physical storage devices 130 and perform synchronization. For example, the messenger client devices may sequentially access all configured physical storage devices 130 to perform synchronization, and may select a specific physical storage device to perform synchronization when the synchronization is manually performed according to the specification of the user.

Figure 3:
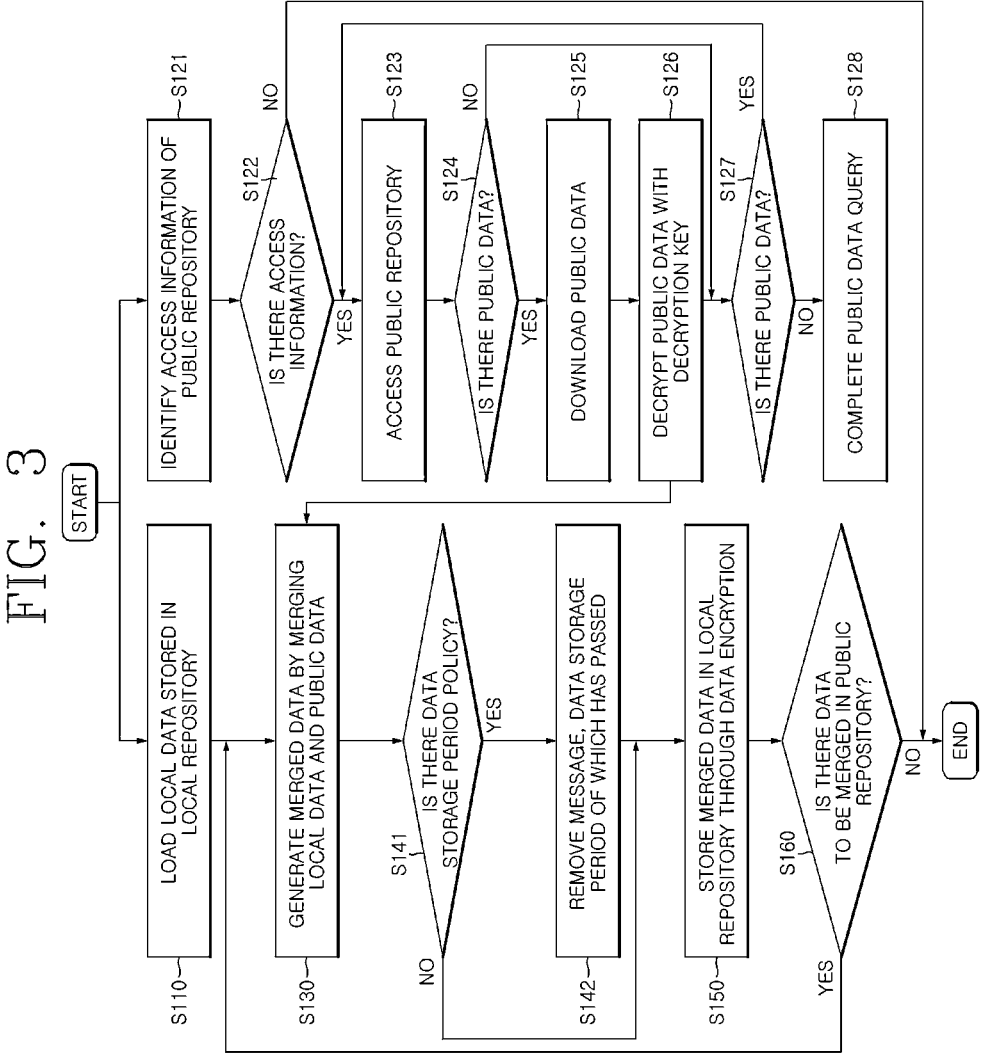
FIG. 3 is a flow chart illustrating synchronization of messages among messenger client devices according to an embodiment of the disclosure.

FIG. 3 is a flow chart illustrating synchronization of messages among messenger client devices according to an embodiment of the disclosure. Here, the messenger client devices may perform a synchronization process for message synchronization when a user logs into the messenger client devices with a user account of the corresponding user.

However, according an to embodiment, message synchronization may be performed when entering one of multiple chat rooms generated by the user account after the login or loading a list of multiple chat rooms. In addition, it may be configured so that message synchronization can be performed in various time points.

Specifically, referring to FIG. 3, the messenger client device may first load local data including previous chat lists stored in its local repository to synchronize messages (S110). According to an embodiment, the messenger client device may receive server data corresponding to a previous chat list of a user account, stored in the messenger server, and then may update the local data by using the server data. That is, the local data locally stored in the messenger client device and the server data stored in the messenger server may be combined to generate local data.

In addition, the messenger client device may access a pre-configured public repository to download public data including a previous chat list shared among the plurality of messenger client devices. That is, the messenger client device may identify whether there is access information of the public repository (S121), and if there is access information (S122), may access the public repository by using the access information (S123). However, if there is no access information (S122), downloading of the public data may be omitted. That is, when there is no access information of the public repository, it means that there is no configured public repository for sharing messages between the multiple messenger client devices. Accordingly, the corresponding messenger client device may omit downloading the public data and display the message lists on the basis of the local data.

In this case, the public data stored in the public repository may be encrypted on the basis of a pre-configured private key-public key. That is, according to a pre-configured security policy, the public data may be encrypted, and in this case, the messenger client device may decrypt the downloaded public data to a decryption key and acquire the same (S126).

According to an embodiment, the public data may be stored on multiple public repositories. For example, the respective messenger client devices may upload public data by specifying a public repository, or public data uploaded to the public repository may be backed up or stored in each of the plurality of physical storage devices. Accordingly, when multiple pieces of access information of the multiple public repositories are included in the access information, the messenger client device may secure public data by access each of the public repositories, and may additionally identify whether there is another public repository to be accessed (S127). Here, when there is another public repository to be accessed, the messenger client device may download and decrypt the public data by accessing the corresponding public repository (S123, S124, S125, and S126), and when there is no more remaining public repository, the messenger client device may complete public data query of the public repository (S128). Here, for each piece of queried public data, data merging with local data may be performed.

That is, the messenger client device may generate merged data by merging local data and public data (S130). The generation of merged data will be described later in detail with reference to FIG. 5. According to an embodiment, there may be a case where there is a data storage period policy, the messenger client device may identify whether there is a data storage period policy (S141). Here, when there is a data storage period policy, messages, the data storage period of which has passed, may be deleted from the merged data and the merged data may be modified (S142). That is, for security or storage reasons, a data storage period policy for each of the messages may exist, and thus the messenger client device may modify the merged data by considering the data storage period policy when generating the merged data.

In addition, for the security reasons, the messenger client device may perform encryption for the generated merged data to store the same in the local repository (S150), may further identify whether there is public repository data to be merged (S160), and then may terminate message synchronization and store the same in the local data repository if there is no other public data. That is, the local data stored in the messenger client device and the public data stored in the public repository are merged, and thus messages may be synchronized among the plurality of messenger client devices.

Thereafter, the messenger client device may display the synchronized previous chat lists and provide the same to the user by using the merged data.

The messenger client device may generate public data including messages transmitted or received from the corresponding messenger client device, and upload the same to the public repository to share the same with other messenger client devices. That is, as illustrated in FIG. 4, a process of generating the public data to which the message generated by the corresponding messenger client device is reflected and uploading the same to the public repository may be performed.

Figure 4:
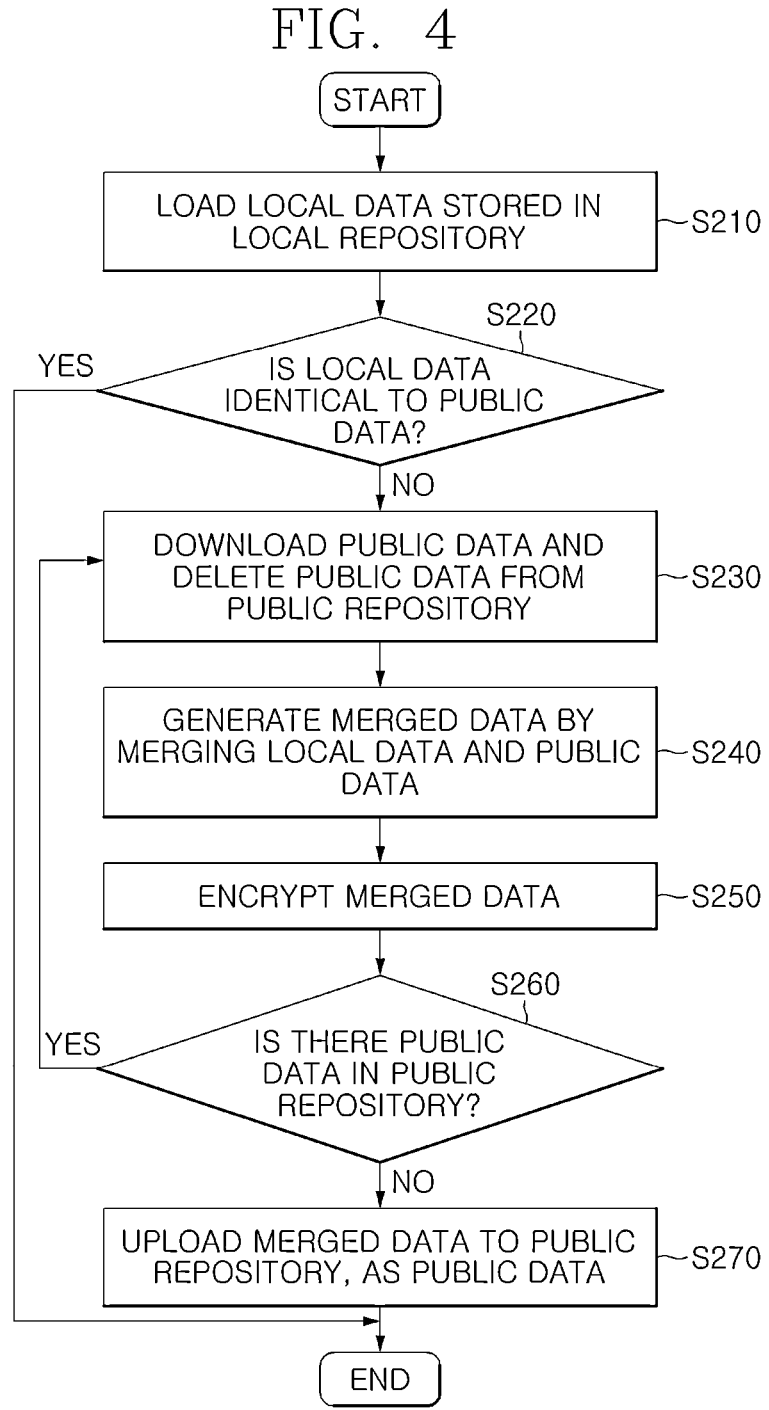
FIG. 4 is a flow chart illustrating public data uploading of a messenger client device according to an embodiment of the disclosure.

Referring to FIG. 4, the messenger client device may load local data stored in its local repository (S210). Thereafter, the messenger client device may access the public repository to determine identity indicating whether the public data and its local data are identical to each other (S220). That is, if the messenger client device has already uploaded the same public data, the messenger client device does not need to repeatedly upload the public data, and thus the messenger client device may identify whether the public data and its local data are identical to each other. According to an embodiment, after comparison between file sizes of the local data and the public data, the identity may be recognized when the file sizes are identical, and the identity may be denied if the file sizes are different from each other. However, the disclosure is not limited thereto, and any scheme may be applied if the identity between the local data and the public data can be determined.

Thereafter, when it is determined that the local data and the public data are different, the messenger client device may download the public data and delete the corresponding public data from the public repository (S230). That is, to resolve a simultaneity problem with other messenger client devices, the corresponding public data may be deleted. For example, there may be a case where while a first messenger client device uploads public data, another second messenger client device accesses the same public data, and in this case, there may be a problem that the public data to be downloaded by the second messenger client device may not reflect details of a chat to be updated by the first messenger client device. That is, different versions of public data may be generated, and accordingly, different details of messages may be stored in the respective messenger client devices. Accordingly, the public data may be deleted in advance from the public repository so as to prevent other messenger client devices from accessing the corresponding public data while one messenger client device uploads the public data.

Thereafter, the messenger client device may generate merged data by merging the local data and the public data (S240), and encrypt the generated merged data for security (S250). Here, the merged data may be generated in the same method as message synchronization, and the generation of the merged data will be described later in detail with reference to FIG. 5.

Thereafter, the messenger client device may identify again whether there is public data in the public repository (S260). When there is public data in the public repository after the generation of the merged data, it means that there is public data uploaded by another messenger client device. Accordingly, when there is public data, the messenger client device may return to the public data downloading and public data deletion stage (S230) and perform merging with the corresponding public data (S240) and encryption (S250). In this case, instead of the local data, the merged data may be merged with new public data, and updated merged data may be generated through this scheme.

Thereafter, when there is no more public data in the public repository (S260), the messenger client device may upload the merged data to the public repository, as the public data. The public data already stored in the public repository is deleted when being downloaded to the local repository of the messenger client device, and thus the messenger client device may repeat the same until there is no public data existing in the public repository, so as to perform generation and updating of the merged data.

When there is no more public data existing in the public repository, the messenger client device may upload the generated merged data to the public repository, as the public data (S270). That is, the messenger client device may finally store the updated public data in the public repository, and terminate the uploading process.

Figure 5:
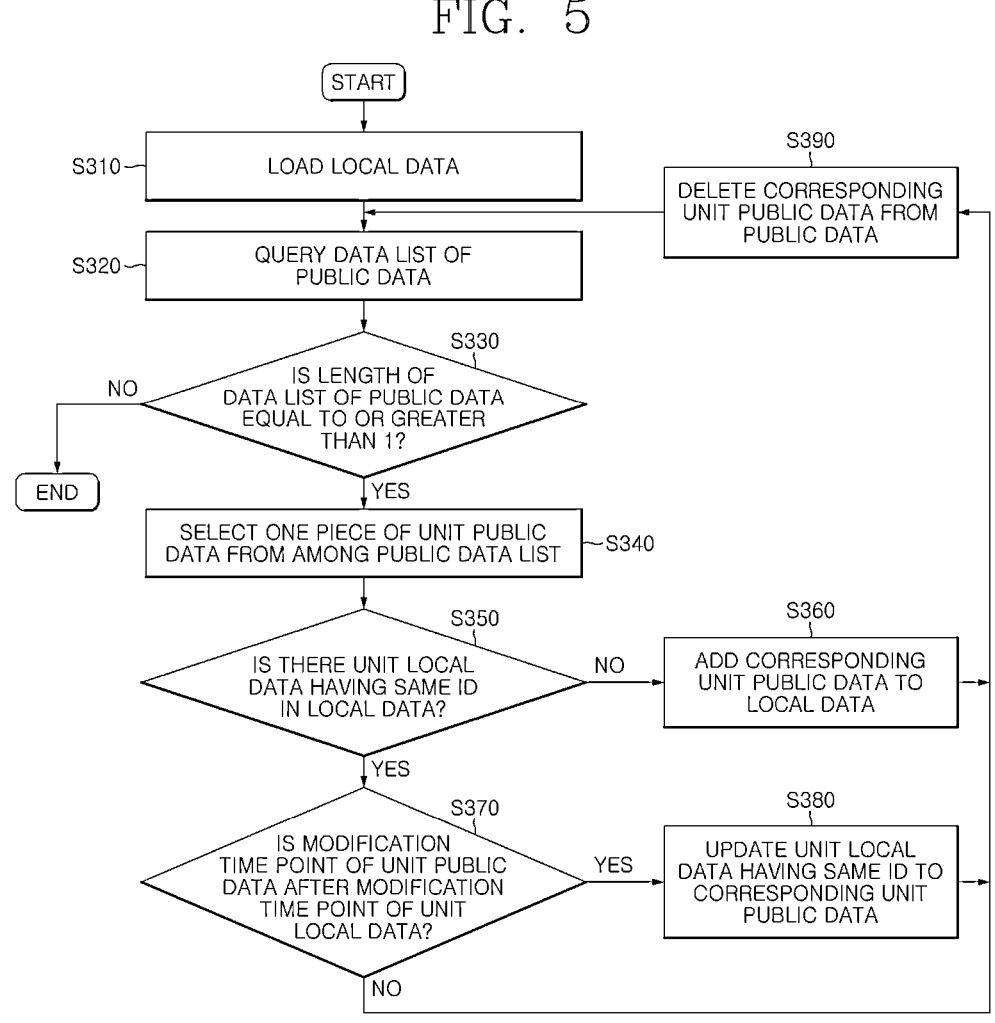
FIG. 5 is a flow chart illustrating merging of messages of messenger client devices according to an embodiment of the disclosure.

FIG. 5 is a flow chart illustrating merging of messages of messenger client devices according to an embodiment of the disclosure. Referring to FIG. 5, a messenger client device may load local data stored in a local repository for merging (S310), and identify a data list of public data included public data (S320). Here, the messenger client device is in a state in which the public data stored in the public repository is already downloaded.

The local data and the public data may include, as illustrated in part (a) of FIG. 6, a chat room ID, a chat room title, a participant list, a chat room generation time point, a chat room state, a chat room modification time point, and the like for each of chat rooms generated by the user account, and may include, as illustrated in part (b) of FIG. 6, a message ID, a chat room ID, a message sender, message content, a transmission time point, a message modification time point, and the like for each of messages included in each of the chat rooms.

For example, a chat room ID may be configured for each chat room, and unit data including a chat room tile, a participation list, a chat room generation time point, a chat room state, a chat room modification time point, etc. of the corresponding chat room may be stored to correspond to the chat room ID. In addition, for the messages transmitted or received in each chat room, a message ID may be configured for each message, and unit data including a chat room ID including the corresponding message, a message sender of the corresponding message, a message content included in the corresponding message, a transmission time point, a message modification time point, etc. may be stored to correspond to the message ID.

Here, the data list of the public data may include unit public data for each chat room and unit public data for each message, and the messenger client device may identify whether the length of the data list of the public data is equal to or greater than 1 (S330). Here, when the length of the data list of the public data is equal to or greater than 1, the messenger client device may select unit public data of one among the data list of the public data (S340), and search for unit local data having the same ID as the unit public data in the local data (S350). That is, the messenger client device may identify whether there is a chat room or message having the same ID. According to an embodiment, unit public data may be first identified for each chat room, and when unit public data varies for each chat room, unit public data may be identified and updated for each message in the corresponding chat room.

Thereafter, when there is no unit local data having the same ID, the unit public data may be added to the local data (S360), and the corresponding unit public data may be deleted (S390). That is, data included in the public data does not exist in the local data, and thus the corresponding unit public data may be added to the local data and the local data may be updated. The unit public data reflected in the local data may be deleted so that the unit public data is prevented from being redundantly reflected.

In addition, when unit local data having the same ID exists (S350), modification time points of the unit local data and the unit public data may be compared again. That is, the data having the same ID is duplicated in the local data and the public data, and thus data modified later between two corresponds to the latest data. Accordingly, to identify this, the modification time points of the unit local data and the unit public data may be compared to each other.

As a result of the comparison, when the modification time point of the unit public data is later than the modification time point of the unit local data (S360), the unit local data may be updated to the unit public data (S380), and the corresponding unit public data may be deleted (S390). That is, when the modification time point of the unit public data is later than the modification time point of the unit local data, the unit public data corresponds to the later data, and thus the unit local data may be updated to the corresponding unit public data and modified. Thereafter, the unit public data reflected to the local data may be deleted so as to prevent the reflection from being duplicated.

On the other hand, when there is unit local data having the same ID (S350) but the modification time point of the unit public data is before the modification time point of the unit local data (S360), the unit local data corresponds to a later data than the unit public data. That is, the latest data is already applied to the local data, thus updating of reflecting the corresponding unit public data may not be performed, and only the corresponding unit public data may be deleted.

Thereafter, a data list of the public data may be updated by reflecting the deleted unit public data, and the operations may be repeated until the public data list becomes 0 by returning to the stage (S320) of identifying the public data list. Here, the local data updated through comparison with each unit public data corresponds to merged data.

As illustrated in FIG. 5, each unit public data is deleted from the public data (S390), and thus the length of the data list of the public data may be finally less than 1, i.e., may be 0, and thus a merging process of generating merged data may be terminated. That is, each unit public data included in entire public data is compared with unit local data of local data to generated merged data, and comparison to the entire public data ends, the merging process may be terminated.

Figure 7:
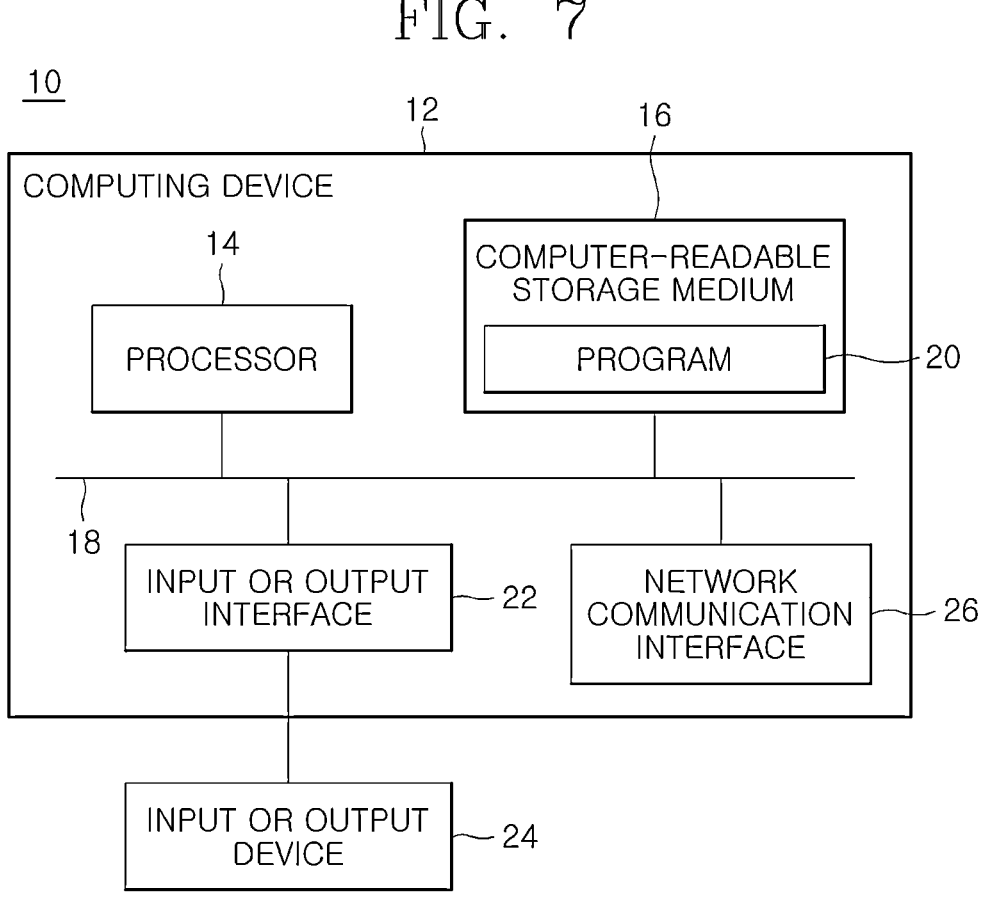
FIG. 7 is a block diagram illustrating a messenger client device according to an embodiment of the disclosure.

FIG. 7 is a block diagram illustrating a computing environment (10) appropriate to be used in exemplary embodiments. In an illustrated embodiment, each component may have different functions and capabilities other than the description below, and may include additional component in addition to the components described below.

The illustrated computing environment 10 includes a computing device 12. In an embodiment, the computing device 12 is a device for synchronizing messages between multiple messenger client devices to which a user account is shared, and may be any messenger client device.

The computing device 12 includes at least one processor 14, a computer-readable storage medium 16, and a commu-nication bus 18. The processor 14 may allow the computing device 12 to operate according to the above-mentioned exemplary embodiment. For example, the processor 14 may execute one or more programs stored in the computer-readable storage medium 16. The one or more programs may include one or more computer-executable instructions, and the computer-executable instructions may be configured to, when executed by the processor 14, cause the computing device 12 to perform operations according to the exemplary embodiment.

The computer-readable storage medium 16 may be configured to store a computer-executable instruction or program code, program data, and/or other suitable types of information. The program 20 stored in the computer-readable storage medium 16 includes a set of instructions executable by the processor 14. In an embodiment, the computer-readable storage medium 16 may be memory (volatile memory such as random access memory, non-volatile memory, or a suitable combination thereof), one or more magnetic disk storage devices, optical disk storage devices, flash memory devices, and other types of storage media which accessed by the computing device 12 and which can store desired information, or a suitable combination thereof.

The communication bus 18 connects various other components of the computing device 12, including the processor 14 and the computer-readable storage medium 16.

The computing device 12 may also include one or more input or output interfaces 22 for providing an interface for one or more input or output devices 24, and one or more network communication interfaces 26. The input or output interface 22 and the network communication interface 26 are connected to the communication bus 18. The input or output device 24 may be connected to another component of the computing device 12 through the input or output interface 22. The exemplary input or output device 24 may include an input device such as a pointing device (a mouse, a trackpad, or the like), a keyboard, a touch input device (a touch pad, a touch screen, or the like), a voice or sound input device, various types of sensor devices and/or image-capturing devices, and/or an output device such as a display device, a printer, a speaker, and/or a network card. The exemplary input or output device 24 may be included in the computing device 12, as a component constituting the computing device 12, and may be connected to the computing device 12 as a separate device distinguished from the computing device 12.

Figure 8:
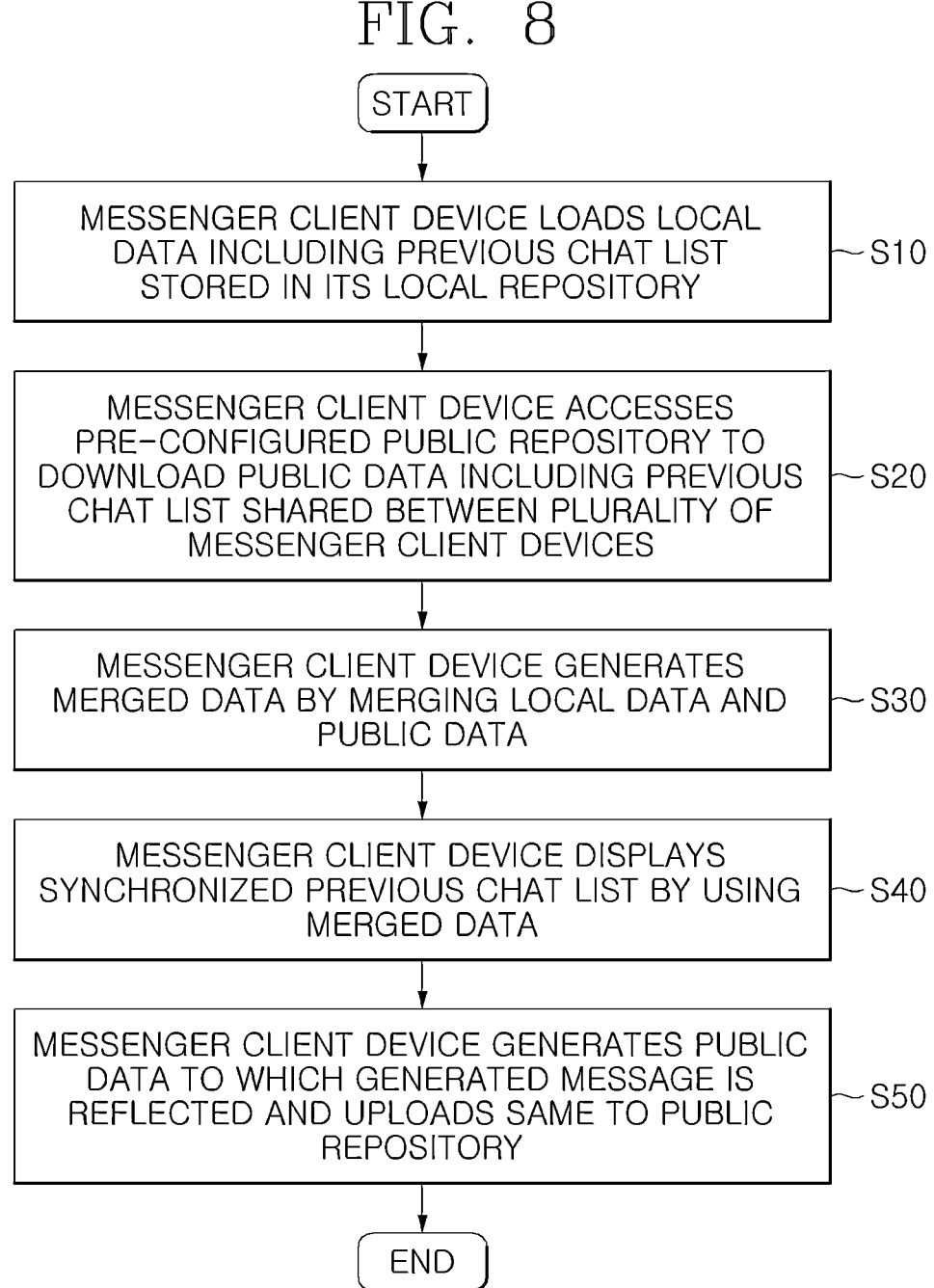
FIG. 8 is a flow chart illustrating a message synchronization method according to an embodiment of the disclosure.
Figure 9:
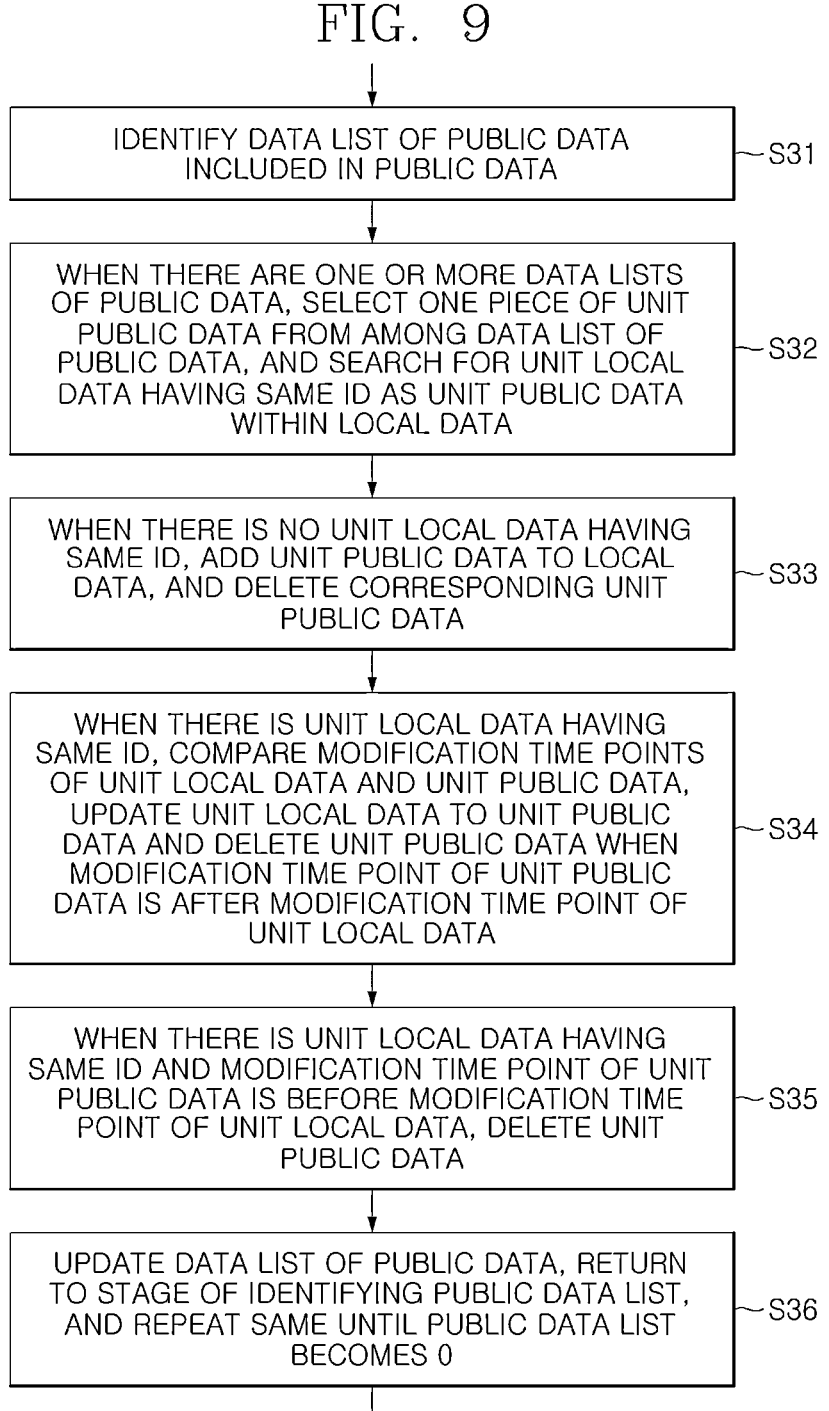
FIG. 9 is a flow chart illustrating a message synchronization method according to an embodiment of the disclosure.
Figure 10:
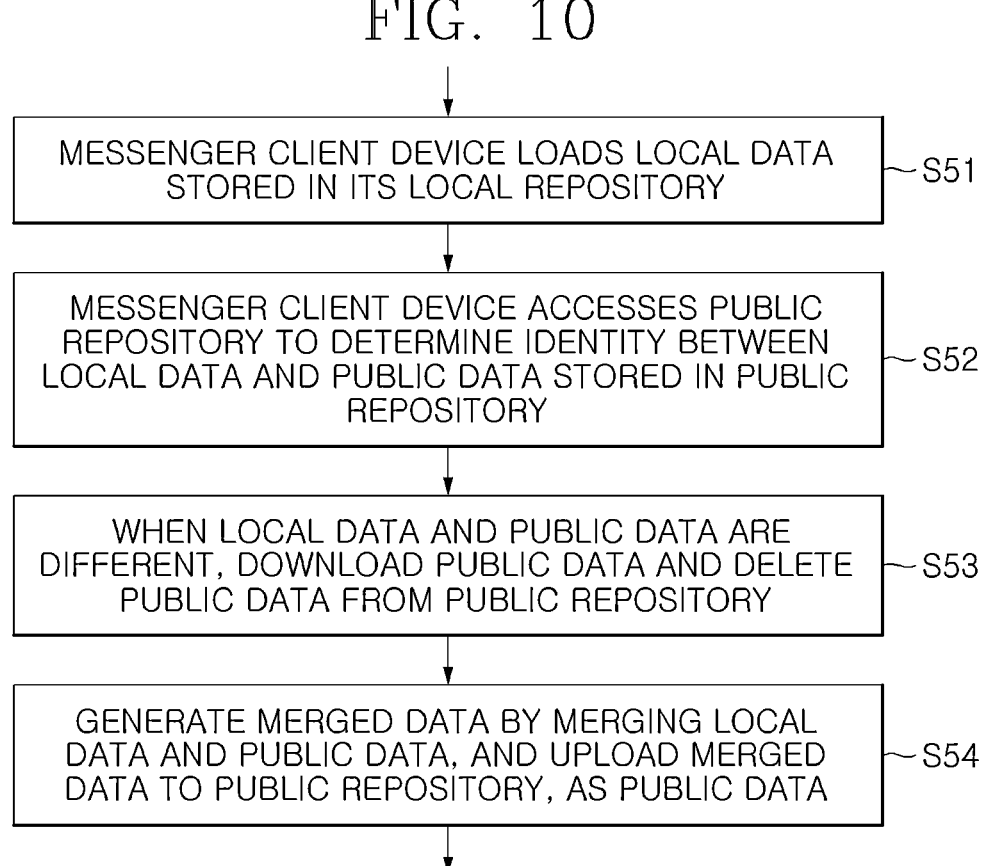
FIG. 10 is a flow chart illustrating a message synchronization method according to an embodiment of the disclosure.

FIGS. 8 and 10 are flow charts illustrating a message synchronization method according to an embodiment of the disclosure. Here, respective stages of FIGS. 8 to 10 may be performed by a messenger client device according to an embodiment of the disclosure.

Referring to FIG. 8, a messenger client device may load local data including a previous chat list stored in its local repository for message synchronization (S10). According to an embodiment, the messenger client device may receive server data corresponding to a previous chat list of a user account, and update the local data by using the server data. That is, local data locally stored in the messenger client device and server data stored in the messenger server may be combined and the local data may be updated.

In addition, the messenger client device may access a pre-configured public repository to download public data including a previous chat list shared among a plurality of messenger client devices (S20). Here, the messenger client device may download the public data when a user logs into one of the plurality of messenger client devices with a user account or when the logged messenger client device enters one of chat rooms generated by the user account. That is, when the user logs into the messenger client, loads a chat room list, or enters a chat room, a synchronization process for message synchronization may be performed and public data downloading may be performed for this.

Here, to access the public repository, the messenger client device may identify access information of the public repository, and access the public repository by using the access information. However, when there is no access information, downloading of the public data may be omitted. That is, when there is no access information of the public repository, it means that there is no configured public repository for message sharing between the plurality of messenger client devices. Accordingly, the corresponding messenger client device may omit downloading of the public data, and display message lists on the basis of the local data.

According to an embodiment, the public data stored in the public repository may be encrypted on the basis of a pre-configured private key-public key. That is, according to a pre-configured security policy, the public data may be encrypted, and in this case, the messenger client device may decrypt the downloaded public data with a decryption key and acquire the same.

The messenger client device may generate merged data by merging local data and the public data (S30). Here, when there is a data storage period policy, according to the data storage period policy, messages, the data storage period of which has passed, among the messages included in the merged data, may be removed, and the merged data may be modified.

According to an embodiment, there may be multiple public repositories, and in this case, each public data may be download through access to each of the public repositories. That is, entire public data downloaded from each of the public repositories may be merged with the local data, and the merged data may be generated.

Specifically, referring to FIG. 9, the messenger client device may first identify a data list of public data included in public data (S31). Here, the local data and the public data may include a chat room ID, a chat room title, a participant list, a chat room generation time point, a chat room state, a chat room modification time point, and the like for each of chat rooms generated by the user account, and may include a message ID, a chat room ID, a message sender, message content, a transmission time point, a message modification time point, and the like for each of messages included in each of the chat rooms. For example, a chat room ID may be configured for each chat room, and unit data including a chat room tile, a participation list, a chat room generation time point, a chat room state, a chat room modification time point, etc. of the corresponding chat room may be stored to correspond to the chat room ID. In addition, for the messages transmitted or received in each chat room, a message ID may be configured for each message, and unit data including a chat room ID including the corresponding message, a message sender of the corresponding message, a message content included in the corresponding message, a transmission time point, a message modification time point, etc. may be stored to correspond to the message ID.

Thereafter, when the length of the data list of the public data is equal to or greater than 1, the messenger client device may select unit public data of one among the data list of the public data, and search for unit local data having the same ID as the unit public data in the local data (S32). Here, the data list of the public data may include unit public data for each chat room and unit public data for each message, and when the length of the data list of the public data is equal to or greater than 1, the messenger client device may identify whether there is a chat room or a message having the same ID in the local data.

When there is no unit local data having the same ID, the unit public data may be added to the local data, and the corresponding unit public data may be deleted (S33). That is, data included in the public data does not exist in the local data, and thus the corresponding unit public data may be added to the local data and the local data may be updated. The unit public data reflected in the local data may be deleted so that the unit public data is prevented from being redundantly reflected.

In addition, when unit local data having the same ID exists, modification time points of the unit local data and the unit public data may be compared again. That is, the data having the same ID is duplicated in the local data and the public data, and thus data modified later between two corresponds to the latest data. Accordingly, to identify this, the modification time points of the unit local data and the unit public data may be compared to each other. Here, when the modification time point of the unit public data is later than the modification time point of the unit local data, the unit local data may be updated to the unit public data, and the corresponding unit public data may be deleted (S34). That is, when the modification time point of the unit public data is later than the modification time point of the unit local data, the unit public data corresponds to the later data, and thus the unit local data may be updated to the corresponding unit public data and modified. In addition, the unit public data reflected to the local data may be deleted so as to prevent the reflection from being duplicated On the other hand, when there is unit local data having the same ID and the modification time point of the unit public data is before the modification time point of the unit local data, the unit public data may be deleted (S35). That is, the latest data is already applied to the local data, thus updating of reflecting the corresponding unit public data may not be performed, and only the corresponding unit public data may be deleted.

Thereafter, a data list of the public data may be updated, and the operations may be repeated until the public data list becomes 0 (S36) by returning to the stage (S31) of identifying the public data list. Here, the local data updated through comparison with each unit public data corresponds to merged data.

When the merged data is generated, the messenger client device may display the synchronized previous chat list by using the merged data (S40). That is, the messenger client device may provide a user with the synchronized messages on the basis of the merged data.

The messenger client device may generate public data to which the generated message is reflected, and upload the same to the public repository (S50). Here, the stage of uploading the public repository (S50) may be executed when a pre-configured condition is satisfied, and the pre-config-ured condition may be configured as, for example, a case where the messenger application that is being executed by the messenger client device is executed for a configured time or longer, a case where a pre-defined specified time point arrives, a case where a configured number or more number of messages are transmitted or received, a case where a logout from the messenger application occurs, a case where the messenger application ends, a case where a hardware state of the messenger client device satisfies a configured condition, a case where a user inputs a synchronization command on the messenger application, etc. In addition, according to an embodiment, the generated public data may be backed up and stored in two or more public repositories among the multiple public repositories.

Specifically, referring to FIG. 10, the messenger client device may load local data stored in its local repository (S51). Thereafter, the messenger client device may access the public repository to determine the identity between local data and public data stored in the public repository (S52). That is, when the messenger client device has already uploaded the same public data, the messenger client device does not need to repeatedly upload the public data, and thus the messenger client device may identify whether the public data and its local data are identical to each other. According to an embodiment, after comparison between file sizes of the local data and the public data, the identity may be recog-nized when the file sizes are identical, and the identity may be denied if the file sizes are different from each other. However, the disclosure is not limited thereto, and any scheme may be applied if the identity between the local data and the public data can be determined.

Thereafter, when the local data and the public data are different, the messenger client device may download the public data and delete the corresponding public data from the public repository (S53). That is, to resolve a simultaneity problem with other messenger client devices, the down-loaded public data may be deleted.

Thereafter, the messenger client device may generate merged data by merging the local data and the public data, and upload the merged data to the public repository, as the public data (S54). Here, the merged data may be generated in the same method as message synchronization described above, and thus a detailed description thereof omitted. According to an embodiment, the generated merged data may be encrypted for security.

After generating the merged data by merging the local data and the public data, whether there is other piece of public data existing in the public repository may be identi-fied. When there is public data in the public repository after the generation of the merged data, it means that there is public data uploaded by another messenger client device. Accordingly, when there is public data, the messenger client device may download the public data and return to the stage of deleting the public data from the public repository (S53). In this case, instead of the local data, the merged data may be merged with new public data, and updated merged data may be generated through this scheme. Thereafter, when there is no more public data in the public repository, the messenger client device may upload the merged data to the public repository, as the public data. That is, the messenger client device may finally store the updated public data in the public repository, and terminate the uploading process.

The disclosure may be implemented in the form of a computer-readable code in a medium having a program recorded therein. A computer-readable recording medium may continue to store a program executable by a computer or may temporarily store the program for execution or download. Furthermore, the medium may be various record-ing means or storage means of a form in which one or a plurality of pieces of hardware has been combined, and is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Further-more, other examples of the medium may include an app store in which apps are distributed, a site in which other various pieces of software are supplied or distributed, and recording media and/or storage media managed in a server. Accordingly, the aforementioned detailed description should not be construed as restrictive in all terms and should be exemplarily considered. The scope of the disclosure should be determined by rational construing of the appended claims and all modifications within an equivalent scope of the disclosure are included in the scope of the disclosure.

The disclosure is not limited by the aforementioned embodiments and the accompanying drawings. It will be apparent to those skilled in the art that components according to the disclosure may be substituted, modified, and changed within the scope without departing from the technical scope of the disclosure.

What is claimed is:

1. A method for synchronizing messages between a plurality of messenger client devices to which a user account is shared, the method comprising:

accessing a pre-configured public repository, separate from and independent of a messenger server, and downloading public data comprising a previous chat list shared between the plurality of messenger client devices by a messenger client device; and generating merged data by merging the public data and local data comprising a previous chat list stored in a local repository of the messenger client device by the messenger client device, wherein merging the public data and the local data occurs without involvement of the messenger server.

2. The method of claim 1, wherein the downloading of the public data comprises downloading the public data when logging into one of the plurality of messenger client devices with the user account, or when the logged messenger client device enters one of chat rooms generated by the user account.

3. The method of claim 1, wherein the local data is obtained by receiving server data corresponding to a previous chat list of the user account from the messenger server and performing updating using the server data.

4. The method of claim 1, wherein the downloading of the public data comprises identifying access information of the public repository by the messenger client device, accessing the public repository by using the access information, and omitting downloading of the public data when the access information does not exist.

5. The method of claim 1, wherein the generating of the merged data comprises when there is a data storage period policy, removing messages, the data storage period of which has passed, from messages included in the merged data, according to the data storage period policy, so as to modify the merged data.

6. The method of claim 1, wherein the local data and the public data comprise:

at least one of a chat room ID, a chat room title, a participant list, a chat room generation time point, a chat room state, and a chat room modification time point for each of chat rooms generated by the user account; and at least one of a message ID, a chat room ID, a message sender, message content, a transmission time point, and a message modification time point for each of messages included in each of the chat rooms.

7. The method of claim 1, further comprising displaying a synchronized previous chat list by the messenger client device by using the merged data.

8. The method of claim 1, wherein the generating of the merged data comprises:

identifying a data list of public data included in the public data;

when there are one or more data lists of the public data, selecting one piece of unit public data from among the data list of the public data, and searching for unit local data having the same ID as the unit public data in the local data;

when there is no unit local data having the same ID, adding the unit public data to the local data and deleting the unit public data;

when there is unit local data having the same ID, comparing modification time points of the unit local data and the unit public data, updating the unit local data to the unit public data when the modification time point of the unit public data is after the modification time point of the unit local data, and deleting the unit public data;

when there is unit local data having the same ID and the modification time point of the unit public data is before the modification time point of the unit local data, deleting the unit public data; and updating the data list of the public data, returning to the identifying of the list of the public data, and repeating the same until the public data list becomes 0.

9. The method of claim 1, wherein the downloading of the public data comprises when there are a plurality of public repositories, accessing each of the public repositories and downloading the public data.

10. The method of claim 9, wherein the generating of the merged data comprises generating the merged data by merging the local data and all public data downloaded from the public repositories.

11. The method of claim 1, further comprising generating public data to which a message generated by the messenger client device is reflected, and uploading the generated public data to the public repository.

12. The method of claim 11, wherein the uploading to the public repository comprises:

loading, by the messenger client device, local data stored in a local repository of the messenger client device;

accessing the public repository and determining identity between the local data and public data stored in the public repository, by the messenger client device;

when the local data and the public data are different from each other, downloading the public data and deleting the public data from the public repository; and generating merged data by merging the local data and the public data, and uploading the merged data to the public repository, as the public data.

13. The method of claim 12, wherein the determining of the identity comprises comparing file sizes of the local data and the public data to determine that the local data and the public data are different from each when the file sizes are different.

14. The method of claim 12, wherein the uploading of the merged data as the public data further comprises:

generating the merged data by merging the local data and the public data;

identifying whether there is other piece of public data in the public repository;

when there is other piece of public data, downloading the public data, and returning to the deleting of the public data from the public repository; and when there is no other piece of public data, uploading the merged data as the public data.

15. The method of claim 12, wherein the uploading to the public repository comprises generating the public data and uploading the generated public data to the public repository in at least one of a case where a messenger application that is being executed by the messenger client device has been executed for a configured time interval or longer, a case where a pre-defined specified time arrives, a case where a configured number or more of messages are transmitted or received, a case where a logout occurs for the messenger application, a case where the messenger application ends, a case where a hardware state of the messenger client device satisfies a configured condition, and a case where a user inputs a synchronization command on the messenger application.

16. The method of claim 11, wherein the uploading to the public repository comprises backing up and storing the public data to two or more of a plurality of public repositories.

17. A computer program connected to hardware and stored in a medium to execute a message synchronization method of claim 1.

18. A messenger client device for synchronizing messages between a plurality of messenger client devices to which a user account is shared, the messenger client device comprising a processor, wherein the processor is configured to:

access a pre-configured public repository, separate from and independent of a messenger server, and download public data comprising a previous chat list shared between the plurality of messenger client devices; and generate merged data by merging the public data and local data comprising a previous chat list stored in a local repository, wherein merging the public data and the local data occurs without involvement of the messenger server.

19. The messenger client device of claim 18, wherein the generating of the merged data comprises:

identifying a data list of public data included in the public data;

when there are one or more data lists of the public data, selecting one piece of unit public data from among the data list of the public data, and searching for unit local data having the same ID as the unit public data in the local data;

when there is no unit local data having the same ID, adding the unit public data to the local data and deleting the unit public data;

when there is unit local data having the same ID, comparing modification time points of the unit local data and the unit public data, updating the unit local data to the unit public data when the modification time point of the unit public data is after the modification time point of the unit local data, and deleting the unit public data;

when there is unit local data having the same ID and the modification time point of the unit public data is before the modification time point of the unit local data, deleting the unit public data; and updating the data list of the public data, returning to the identifying of the list of the public data, and repeating the same until the public data list becomes 0.

20. The messenger client device of claim 18, wherein the processor is further configured to generate public data to which a message generated by the messenger client device is reflected, and upload the generated public data to the public repository.

* * * * *